US011826980B2

(12) United States Patent
Baart et al.

(10) Patent No.: US 11,826,980 B2
(45) Date of Patent: Nov. 28, 2023

(54) METAL SUBSTRATE WITH A SURFACE TEXTURE

(71) Applicant: TATA STEEL NEDERLAND TECHNOLOGY B.V., Velsen-Noord (NL)

(72) Inventors: Pieter Baart, Heiloo (NL); Derk Jan Wentink, Haarlem (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 33 days.

(21) Appl. No.: 17/640,999

(22) PCT Filed: Sep. 17, 2020

(86) PCT No.: PCT/EP2020/076011
§ 371 (c)(1),
(2) Date: Mar. 7, 2022

(87) PCT Pub. No.: WO2021/053088
PCT Pub. Date: Mar. 25, 2021

(65) Prior Publication Data
US 2022/0332091 A1   Oct. 20, 2022

(30) Foreign Application Priority Data
Sep. 18, 2019  (EP) .................................. 19198137

(51) Int. Cl.
*B23K 26/362* (2014.01)
*B21B 1/22* (2006.01)
*B32B 15/01* (2006.01)
*B32B 3/26* (2006.01)

(52) U.S. Cl.
CPC ............ *B32B 15/013* (2013.01); *B32B 3/263* (2013.01); *B21B 1/227* (2013.01); *B23K 26/362* (2013.01)

(58) Field of Classification Search
None
See application file for complete search history.

(56) References Cited

U.S. PATENT DOCUMENTS

2015/0209848 A1   7/2015   Kopplin et al.

FOREIGN PATENT DOCUMENTS

| DE | 102012017703 A1 | 3/2014 |
| WO | 2017125497 A1 | 7/2017 |

OTHER PUBLICATIONS

International Search Report and Written Opinion dated Nov. 17, 2020 for PCT/EP2020/076011 to Tata Steel Nederland Technology B.V. filed Sep. 17, 2020.
Zhaoyang Wang et al., "3D shape measurement using image-matching-based techniques", Proceedings of SPIE; Dimensional Optical Metrology and Inspection for Practical Applications VI, vol. 10220, 1022003, May 1, 2017, pp. 1-10, XP060089229.

(Continued)

*Primary Examiner* — Adam Krupicka
(74) *Attorney, Agent, or Firm* — Vorys, Sater, Seymour and Pease LLP (57) ABSTRACT

A metal substrate provided with a surface texture wherein the Maximum Zero Normalised Auto Correlation (MZNAC) of the surface texture is in the range of 0.2-0.8, as well as a method to apply such surface textures on a metal substrate.

18 Claims, 8 Drawing Sheets

(56) References Cited

OTHER PUBLICATIONS

Wentink D J et al: "A generic model for surface texture development, wear and roughness transfer in skin pass rolling", Wear, vol. 328-329, Apr. 15, 2015, pp. 167-176, XP029226510.
Pan et al., Meas. Sci. Technol. 20, (2009), 062001 (17pp) Two-dimensional digital image correlation for in-plane displacement and strain measurement: a review, doi: 10.1088/0957-0233/20/6/062001.

METAL SUBSTRATE WITH A SURFACE TEXTURE

CROSS-REFERENCE TO RELATED APPLICATIONS

This is a § 371 National Stage Application of International Application No. PCT/EP2020/076011 filed on Sep. 17, 2020, claiming the priority of European Patent Application No. 19198137.2 filed on Sep. 18, 2019.

FIELD OF THE INVENTION

The invention relates to a metal substrate provided with a surface texture characterised in that the Maximum Zero Normalised Auto Correlation (MZNAC) of the surface texture is between 0.2-0.8, as well as to a method to apply such surface textures on a metal substrate.

BACKGROUND OF THE INVENTION

In the finishing of (coated) metal strip, a metal strip is subjected to levelling and/or temper rolling. With levelling the shape and flatness of the strip are controlled and with temper rolling the mechanical properties of the metal strip are improved by lengthening of the strip. Also the surface quality of the strip is improved as far as it concerns appearance, surface texture and surface function(ality). With the temper rolling step a texture may be transferred to the surface of the strip from the work rolls to get a certain function. The texturing of the metal strip is tailored to the requirements of the end user, for instance end users in the automotive industry.

The surface texture of the metal substrate has several important functional aspects such as tribological properties, press performance, paint properties and visual appearance. Recently, new methodology to apply surface textures by design have been developed, for example by means of laser textured work rolls or by laser texturing directly on the metal substrate as described in WO2017/125497A1. These methodologies open up the possibility to improve and customize the surface texture such that more advanced surfaces with enhanced surface functionality can be created. Metal substrates with (pseudo)deterministic surface texture have shown excellent surface properties for visual appearance and press performance. However, the problem with such surface texture is the possible occurrence of moiré patterns Moiré patterns may occur when two or more textures are superposed, e.g. in rolling strip with multiple passes in rolling mills with at least one (pseudo)deterministic textured roll or when digital images are made of deterministic textured surface, for example by camera's or surface inspection systems. This influences the visual appearance of the final product in a negative manner.

SUMMARY OF THE INVENTION

Therefore it is an objective of this invention to provide a metal substrate comprising a surface texture which has an enhanced surface functionality, in particular good paint properties, while simultaneously suppressing the Moiré pattern. It is a further objective of this invention to provide a method to obtain such a metal substrate.

DETAILED DESCRIPTION OF EMBODIMENTS

In a first aspect according to the invention a metal substrate is provided with a surface texture characterised in that the Maximum Zero Normalised Auto Correlation (MZNAC) of the surface texture is in a range of 0.2-0.8.

It was observed that a metal substrate with a surface texture with a MZNAC in a range of 0.2-0.8 showed an acceptable level of Moiré patterns, while maintaining good paint properties. A Zero Normalised Auto Correlation (ZNAC) of a surface can be obtained from the Zero Normalised Cross Correlation (ZNCC) as described by Pan et.al, Meas. Sci. Technol. 20 (2009) 062001, doi:10.1088/0957-0233/20/6/062001, in table 1, by adjusting the formula for a single surface (f=Z and g=Z). Hence the ZNAC can be obtained from the following equation:

$$ZNAC = \sum_{i=-M}^{M} \sum_{j=-M}^{M} \left\{ \frac{[Z(x_i, y_j) - Z_m] \times [Z(x'_i, y'_j) - Z_m]}{\Delta Z \Delta Z} \right\},$$

with $x'_i = x_i + \Delta x$ and $y'_j = y_j + \Delta y$

The ZNAC should be determined for a sample of at least 2 mm×2 mm, with a spacing of at most 2 μm. $\Delta x$ and $\Delta y$ should be determined up to at least 0.3 mm, to obtain a representative value. The MZNAC can be determined from the ZNAC and relates to the highest peak in the ZNAC, except for the peak at $\Delta x = \Delta y = 0$, also referred to as the 0,0 peak. To determine the MZNAC, the 0,0 peak is disregarded, as that peak will always be 1. The MZNAC of the surface texture should be in a range of 0.2-0.8 to have good paint properties and an acceptable Moiré pattern. The term paint properties is to be understood to comprise both paint appearance as well as paint adherence, The most important feature for the paint properties is waviness (Wsa), in addition to roughness (Ra) and peak count (RPc) as well known to a person skilled in the art. Ra and RPc may be determined according to ISO4278 or EN10094, using a threshold of +/−0.5 μm for RPc. Wsa can be determined according to SEP1941 with filter cut off $\lambda_c = 1$ mm and $\lambda_f = 5$ mm, also referred to as $Wsa_{1-5}$.

It should be noted that in the context of this invention, the surface texture relates to the height topography of the surface, i.e. a surface height map consisting of features such as peaks and valleys.

It was found by the inventors that a metal substrate with an MZNAC below 0.2 had an unacceptable waviness (Wsa), while a metal substrate with an MZNAC above 0.8 showed too much moiré effect. Hence the MZNAC should be at least 0.2, preferably at least 0.3, more preferably at least 0.4 to have a good waviness. At the other hand, the MZNAC should be at most 0.8, preferably at most 0.7, more preferably at most 0.6 to suppress the moiré effect of a surface texture on the metal substrate. In a preferred embodiment, the MZNAC is in a range of 0.2-0.6 to enable a surface texture with sufficient waviness and excellent moiré suppression. In another preferred embodiment, the MZNAC is in a range of 0.4-0.8 to enable a surface texture with sufficient moiré suppression and excellent waviness. In another preferred embodiment, the surface texture has a MZNAC in a range of 0.4-0.6, which allows a well balanced surface texture in terms of moiré suppression and waviness. Deterministic surface texture as described in the prior art will have a MZNAC above 0.8 and will suffer from moiré patterns, whereas a stochastic surface texture, for example a metal substrate with a surface texture obtained from an EDT treated work roll, will have a MZNAC below 0.2 and hence mediocre paint properties.

The metal substrate according to the invention is preferably a blank or a strip. The metal could in principle be any metal, but in most cases will be steel, which for automotive purposes comprises (advanced) high strength steels for instance for parts such as A, B, C, (D) pillars, and also softer better formable steels for outer panels.

In a preferred embodiment, the metal substrate according to the invention comprises a metallic coating layer, preferably a zinc based coating or a tin based coating. In a preferred embodiment the metal substrate is steel. In case of a steel strip or blank the material will typically be provided with a metallic coating to prevent corrosion of the substrate. In most cases such a metallic coating is provided on the metal substrate before applying a surface texture. However, when very thin coatings are applied, for instance by means of Physical Vapour Deposition (PVD), the texture patterns may be applied before applying the coating. Metallic coatings comprise Zn coatings and Zn alloy coatings such as ZnAl, ZnMg, ZnAlMg coatings, Cr and Cr alloy coatings and Sn and Sn alloy coatings.

In a preferred embodiment, the surface texture of the metal substrate comprises a height map with a plurality of features with a pseudo deterministic spatial distribution.

The term features comprises hills and valleys. Valleys may be depression, recesses or dimples, which are used interchangeably and comprise depressions, recesses or dimples of any shape. Hills may be bulges or protrusion, which are used interchangeably and comprise bulges or protrusion of any shape. The features can be made by methods as known to a person skilled in the art. One method may be by imprinting these features on the metal substrate via a textured work roll. Such a work roll is typically obtained by electric discharge texturing (EDT), electron beam texturing (EBT) or laser texturing the work roll. Another method is to apply the plurality of features directly on the metal substrate, for example by laser treatment, for example laser ablation or laser deposition, or chemical etching. Typically such features are applied on the metal substrate which already has a surface texture inherited from the process, e.g. from a temper mill. By varying the location of the features, various properties such as moiré effect, waviness, peak count, roughness, and tool and/or press performance may be further optimised, either locally or on the whole metal substrate. The positioning of the features is preferably done in a pseudo-deterministic manner. In general a pseudo-deterministic positioning will result in a suppression of the moiré effect relative to deterministic positioning. The features can be applied in regular raster (deterministic), e.g. a hexagonal or square raster, and can be dislocated to a certain degree to obtain a pseudo deterministic surface texture. This dislocation can be measured from the centre points of the deterministic raster. The centre points are spaced apart at a distance r, wherein r is preferably in the range of 0.2 μm to 100 μm. The dislocation of a feature from the centre points of the deterministic raster varies preferably stochastically in a range of 0-60% of the distance r, at a random angle in the range of 0-360°. The dislocation of a feature from the centre points of the deterministic raster varies more preferably in a range of 0-45%, most preferably in a range of 0-30%. In general, a higher variation in dislocation with respect to the deterministic raster will result in a lower MZNAC.

In a preferred embodiment the stochastic dislocation of the features relative to the deterministic raster follows a Gaussian distribution where 3 times the standard deviation equals 60% of the distance r, more preferably 45% of the distance r, most preferably 30% of the distance r.

In a preferred embodiment the stochastic dislocation of the features relative to the deterministic raster follows a superposition of a Gaussian shaped and rectangular shaped distribution. Preferably, 3 times the standard deviation of the Gaussian distribution is at most 60% of the distance r, more preferably 45% of the distance r, most preferably 30% of the distance r. The boundary of the rectangular shaped distribution is preferably at most 60% of the distance r, more preferably 45% of the distance r, most preferably 30% of the distance r.

In a preferred embodiment, the features have an average diameter in a range of 25-120 μm preferably in a range of 25-70 μm, most preferably in a range of 30-45 μm. A surface texture with an average diameter of the features in this range will be beneficial to optimise waviness. Below 25 μm the preparation of the features will become challenging. In the case of making surface texture with a rolling process, the roughness transfer becomes less robust. In the case of making the surface with a laser, the process will be less efficient. Above 120 μm the length scale of the surface texture becomes too coarse and the waviness increases such that the paint properties will be worse.

In a preferred embodiment, the features have an amplitude in a range of 0.2-12 μm. A surface texture with the amplitude of the features in a range of 0.2-12 μm will lead to a low waviness change due to the applied surface texture. Amplitude can be interpreted as depth or height of the feature. Thus, if the feature is a hill, the feature will have a height in range of 0.2-12 μm; if the feature is a valley, the feature will have a depth in a range of 0.2-12 μm. For automotive purposes, the features preferably have an amplitude in a range of 2-7 μm, more preferably 3-5 μm. Below 2 μm the roughness of the surface texture will become insufficient, negatively impacting the press performance. In case of a coated metal substrate, the depressions may pierce the upper layer completely at a depth of 12 μm. For packaging purposes, for example for tin plated cans, the features on the uncoated steel preferably have an amplitude in a range of 0.2 μm to 5 μm. In this range, a desired roughness (Ra) in a range between 0.10 and 2.5 μm may be obtained.

In a preferred embodiment, the features have a density in a range between 100 to 10000 per square millimetre, preferably 180 to 600 per square millimetre. A metal substrate with features with a density in a range between 100 to 10000 per square millimetre may increase the roughness of the metal substrate, which is important for paint adhesion and press performance. In order to maintain a good Wsa, while increasing roughness, the feature density is at least 100 features per square millimetre, more preferably at least 150 features per square millimetre, most preferably at least 180 features per square millimetre. The higher density is limited by the method of texturing, for example a density of 10000 features per square millimetre is feasible with ultrafine laser texturing, whereas imprinting may be limited to a density of 600 features per square millimetre.

In a preferred embodiment, the metal substrate has a Wsa of at most 0.4 μm to obtain optimal paint properties. Preferably, the Wsa is at most 0.3 μm, more preferably 0.20 μm. Wsa can be measured according to SEP1941

In a further aspect according to the invention, a method is provided to obtain a metal substrate with a surface texture with a MZNAC in the range of 0.2-0.8, comprising the steps of
  a. Providing a metal substrate
  b. Optionally temper rolling the metal substrate
  c. Providing a surface texture by texturing means.

In a first step the metal substrate is provided. The metal substrate can be either coated, or uncoated, and may be provided as a strip or sheet, for example a coiled steel strip. Optionally, the metal substrate may be temper rolled in a second step to obtain desired mechanical properties and/or an initial low roughness of the strip. Preferably, the metal substrate is temper rolled to a roughness to an arithmetic mean height Ra<1.4 μm, more preferably to Ra<1.2 μm, most preferably to Ra<0.9. Such roughness will make the metal substrate especially suitable for automotive purposes. Finally a surface texture will be provided to the metal substrate by a texturing means, which results in a metal substrate with a surface texture with a MZNAC in a range of 0.2-0.8. It is also possible to temper roll the metal substrate during the same step the surface texture is applied, for example if the surface texture is provided by a texturing means such as a temper mill work roll. The surface texture may be applied locally on the metal substrate or on the full width and length of the strip. The texturing means may be either an imprinting means, such as a work roll or a press, wherein the surface texture is imprinted by the imprinting means to the metal substrate or may be a obtained by texturing means, such as a laser, electron beam, plasma etching or chemical etching, wherein the surface texture is obtained by a direct treatment of the metal substrate. For example, with a laser the surface texture may either be obtained via laser ablation or via laser assisted melting and redepositing of the material.

In an embodiment, the texturing means is a textured work roll and the surface texture on the steel substrate is provided by imprinting a surface texture on the metal substrate by one or more textured work rolls.

In an embodiment, the texturing means is a laser and the surface texture is provided by laser ablation or laser assisted melting and redepositing In an embodiment, the method further comprises the steps of
  d. Providing an additional surface texture by an additional texturing means
  e. Optionally repeating step d By applying one or more additional texturing steps, a tailor made surface texture may be obtained. For example, a first texture pattern may be applied with a textured work roll over the full width and length of the metal substrate to ensure good paint properties, and a second texture pattern may be applied locally with laser ablation to ensure good tribological properties for forming on the critical areas. Alternatively two or more texturing steps may be performed over the full width and length of the metal substrate to ensure a MZNAC in the range of 0.2-0.8, for example by superposing several surface texture modifications on top of each other to obtain a metal substrate with a MZNAC in the range of 0.2-0.8 and hence good paint appearance and suppressed moiré patterns. In a preferred embodiment, the texturing means may be laser ablation which results in a pattern of depressions in the metal substrate or by a textured work roll, which imprints the surface texture on the metal substrate.

A product either has one side or both sides that have to meet high appearance standards, but in most cases as for instance with products for the automotive industry there is only one side that has to fulfil the highest appearance standards. The opposite side is covered and will normally not be visible in which case appearance is far less important. However, the tribological properties and press performance are equally important on both sides. Accordingly it is provided that only one side of the metal substrate is provided with texture patterns or wherein different texture patterns and/or different areas are provided with texture patterns on opposite sides of the metal substrate. With a texture pattern applied according to the method on only one side, for example using laser ablation, the other side will still have a texture resulting from the temper rolling of the metal substrate.

The invention will be further explained by means of the examples shown in the drawings obtained from computational studies.

FIG. 1A, FIG. 1B, FIG. 1C AND FIG. 1D. Show an overview of the correlation of MZNAC and waviness for several surface textures, from exampleS 1-11.

Figure 1A:
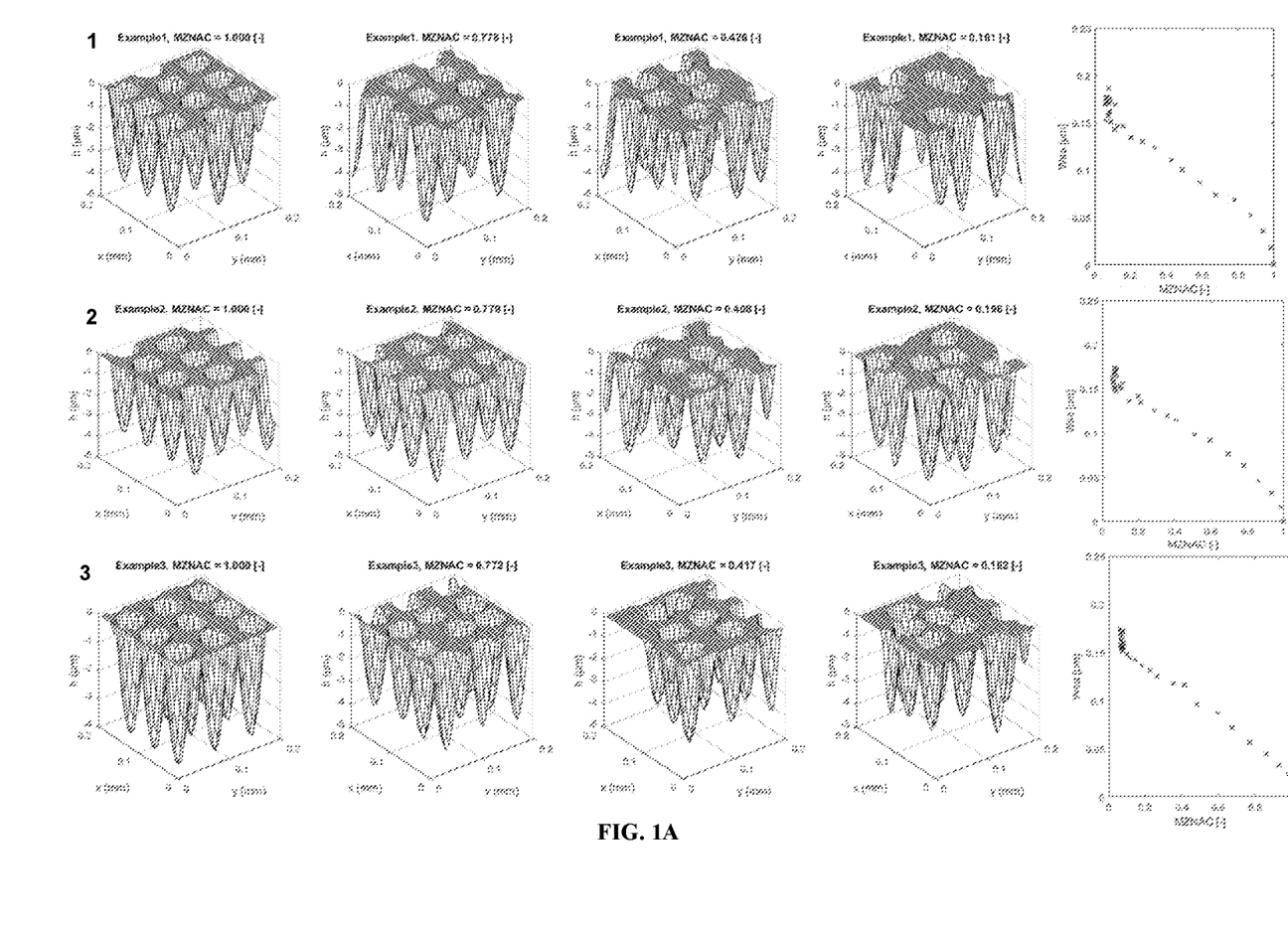
FIG. 1A, FIG. 1B, FIG. 1C and FIG. 1D show an overview of the correlation of MZNAC and waviness for several surface textures, from examples 1-11.
Figure 1B:
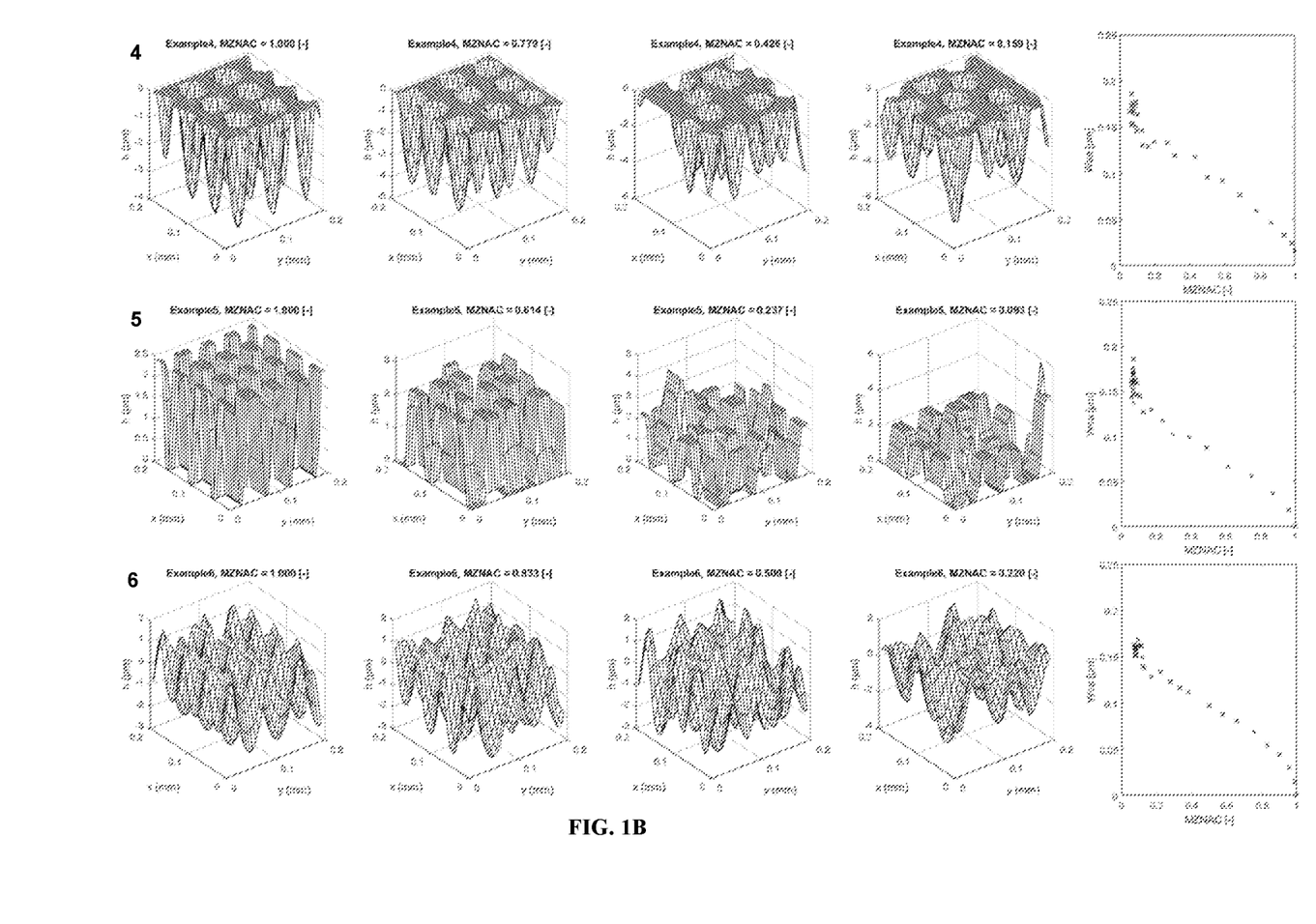
Figure 1C:
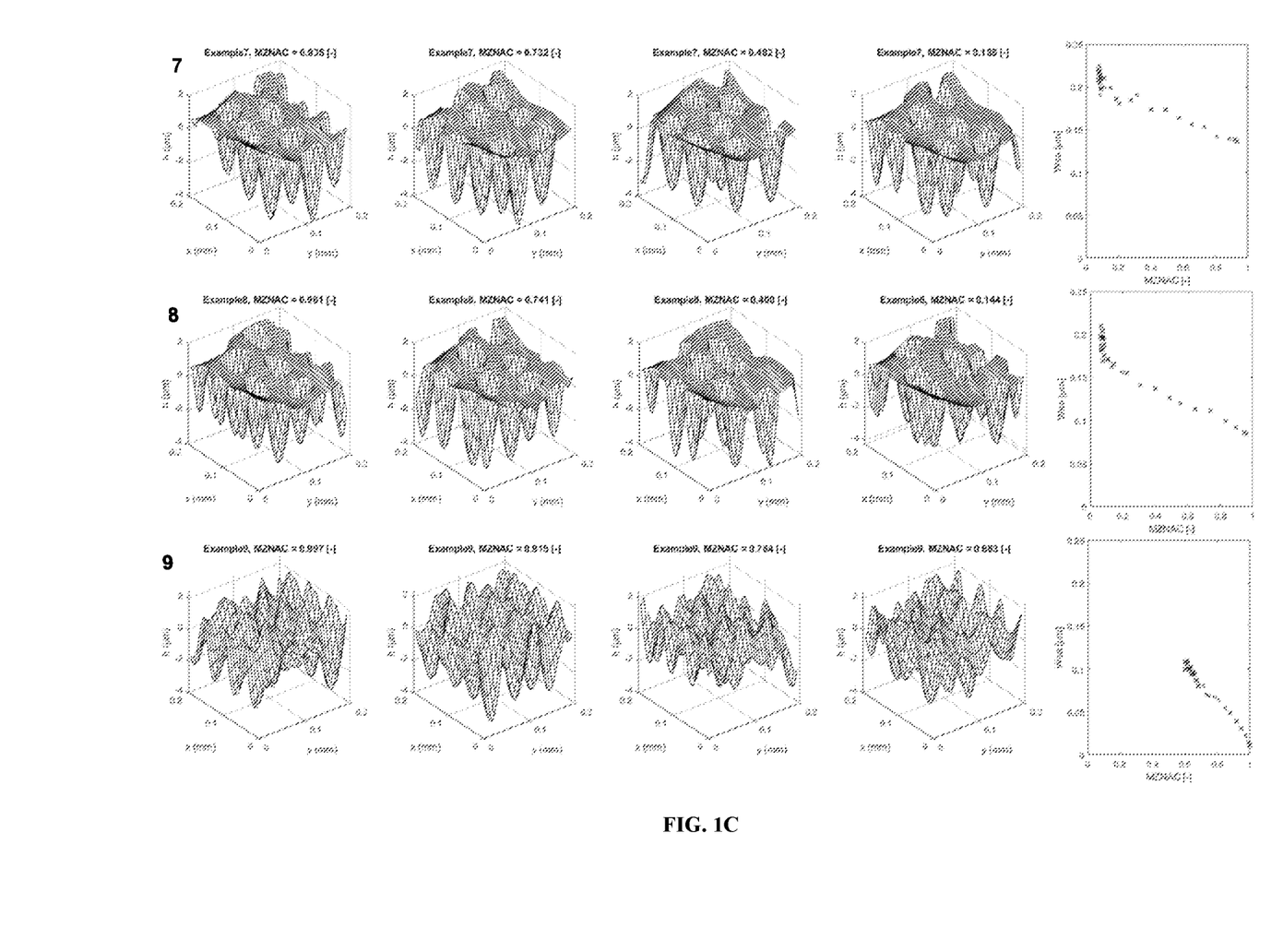
Figure 1D:
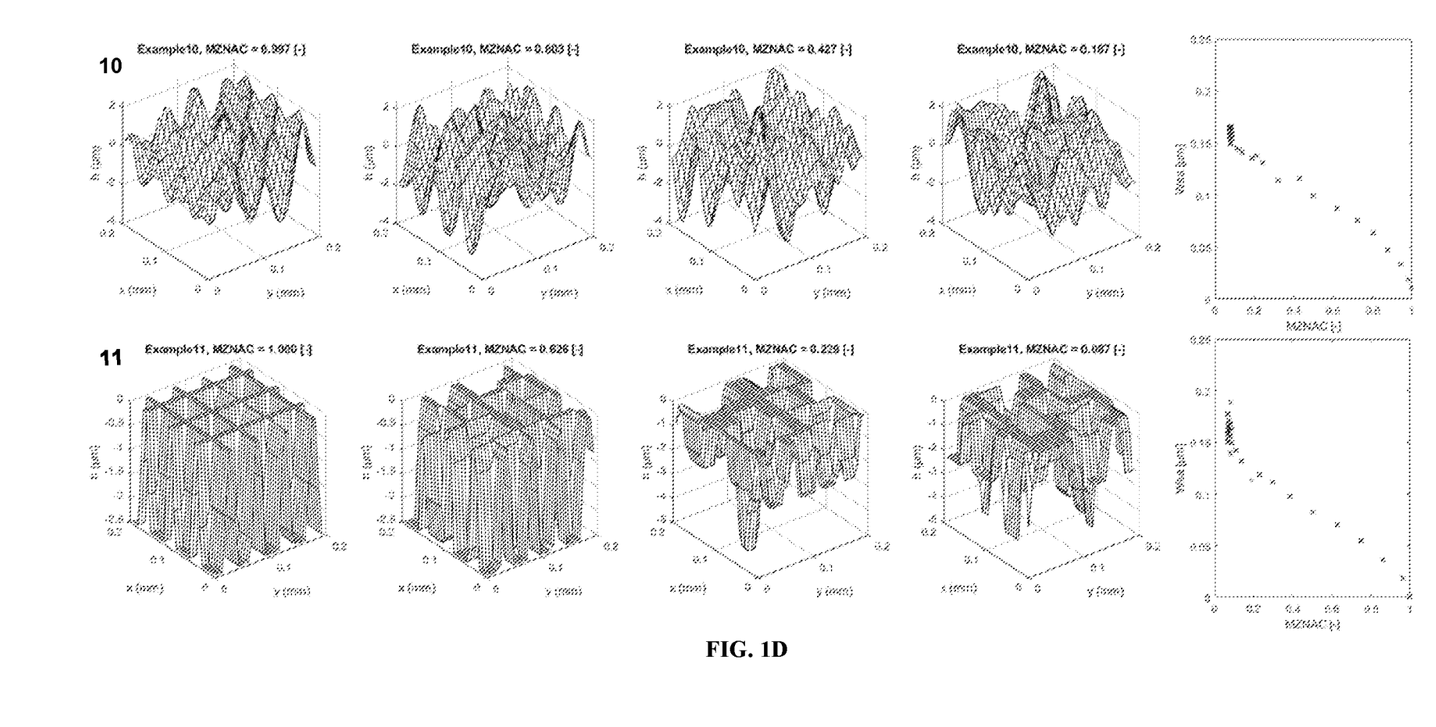
Figure 2:
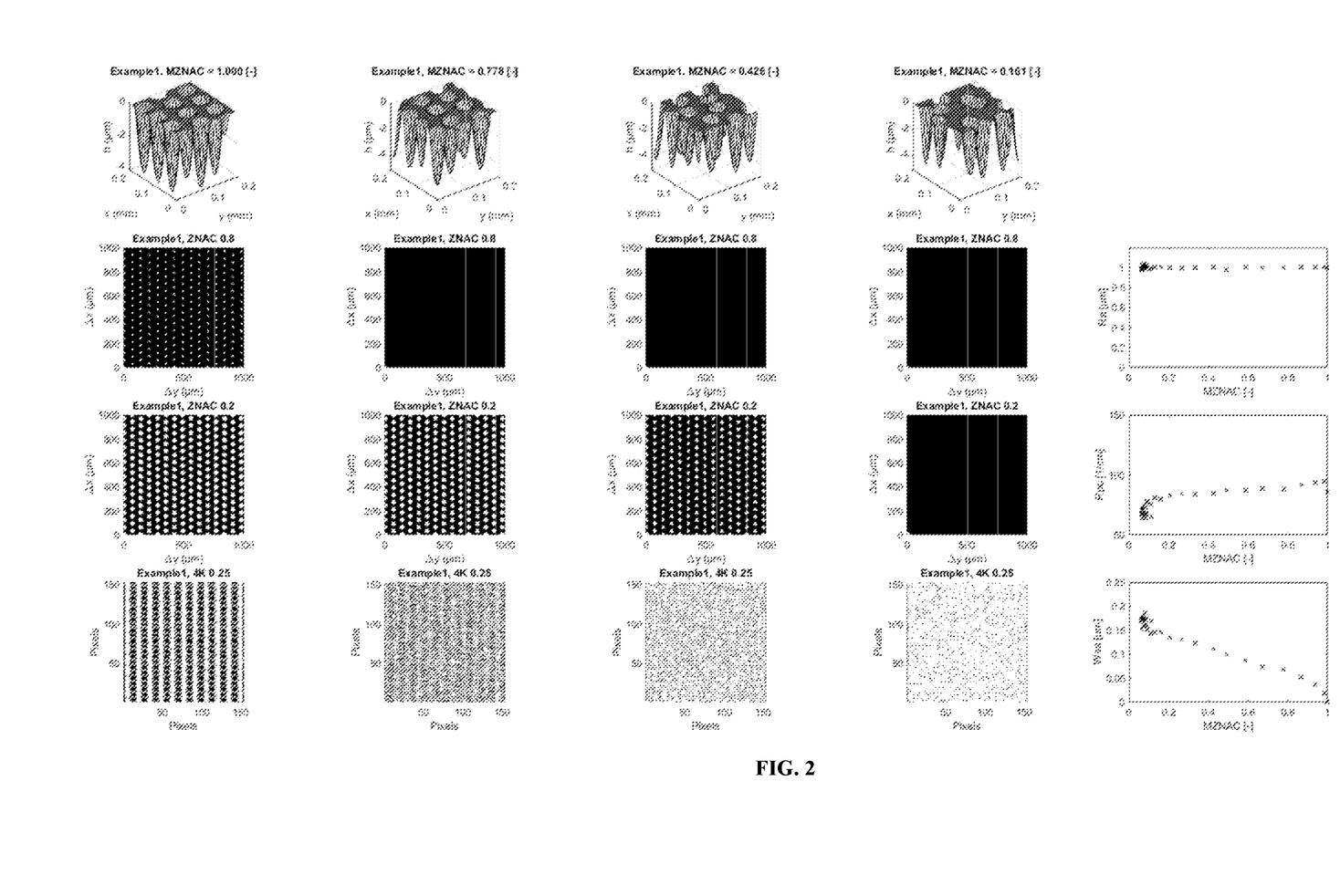
FIG. 2 shows four surface textures of example 1, the corresponding ZNAC peaks above 0.8 (second row), the corresponding ZNAC peaks above 0.2 (third row), the corresponding moiré patterns (last row), and the correlation of the MZNAC value of example 1 surface textures with parameters Wsa, RPc and Ra.

FIG. 2. Shows four surface textures of example 1 varying from deterministic to pseudo deterministic to stochastic like (left to right), the corresponding ZNAC peaks above 0.8 (second row), the corresponding ZNAC peaks above 0.2 (third row) and the corresponding moiré patterns (last row). FIG. 2 also shows the correlation of the MZNAC value of example 1 surface textures, with parameters Wsa, RPc and Ra.

Figure 3:
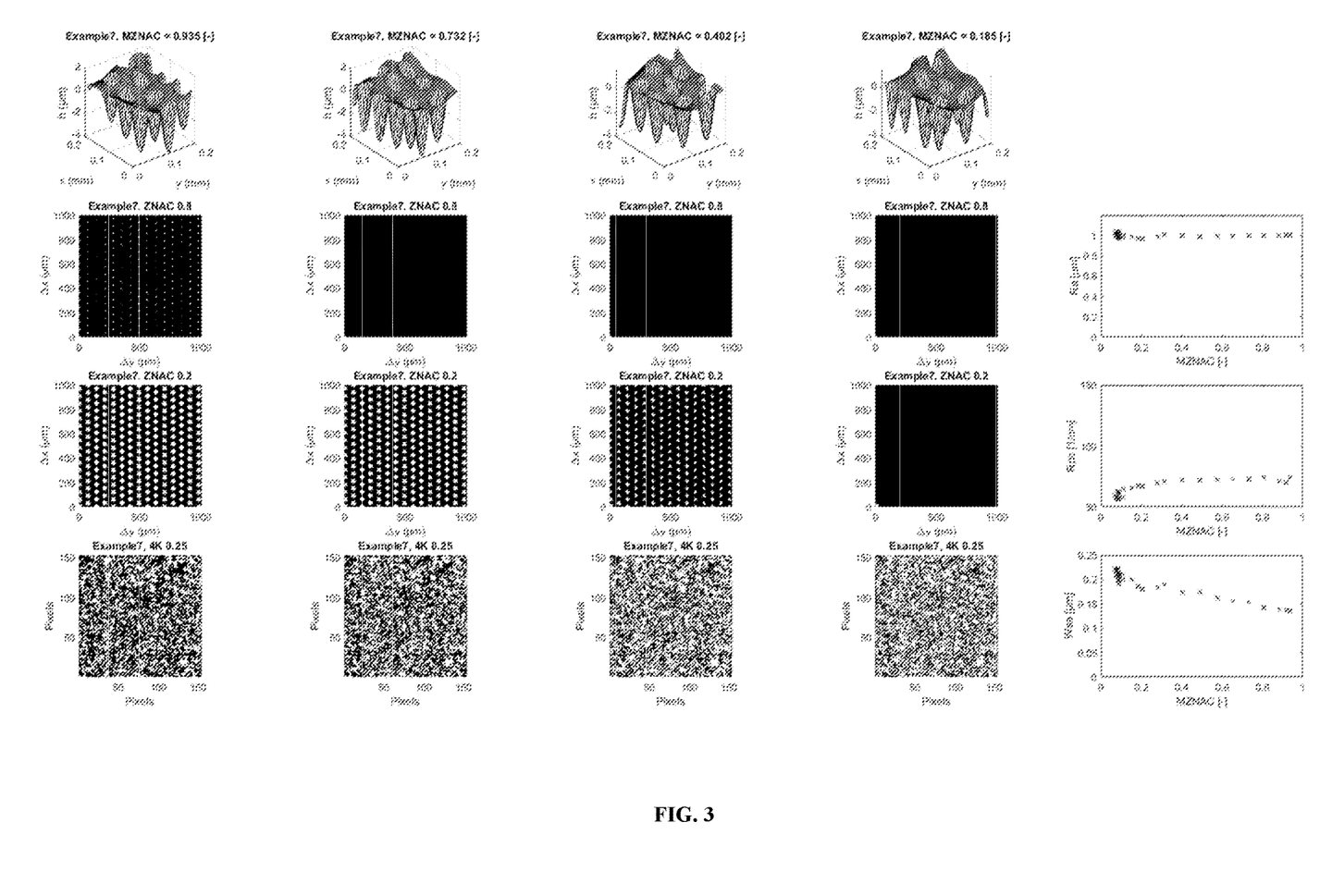
FIG. 3 shows four surface textures of example 7, the corresponding ZNAC peaks above 0.8 (second row), the corresponding ZNAC peaks above 0.2 (third row), the corresponding moire patterns (last row), and the correlation of the MZNAC value of example 7 surface textures with parameters Wsa, RPc and Ra.

FIG. 3. Shows four surface textures of example 7 varying from deterministic to pseudo deterministic to stochastic like (left to right), the corresponding ZNAC peaks above 0.8 (second row), the corresponding ZNAC peaks above 0.2 (third row) and the corresponding moiré patterns (last row). FIG. 3 also shows the correlation of the MZNAC value of example 7 surface textures, with parameters Wsa, RPc and Ra.

Figure 4:
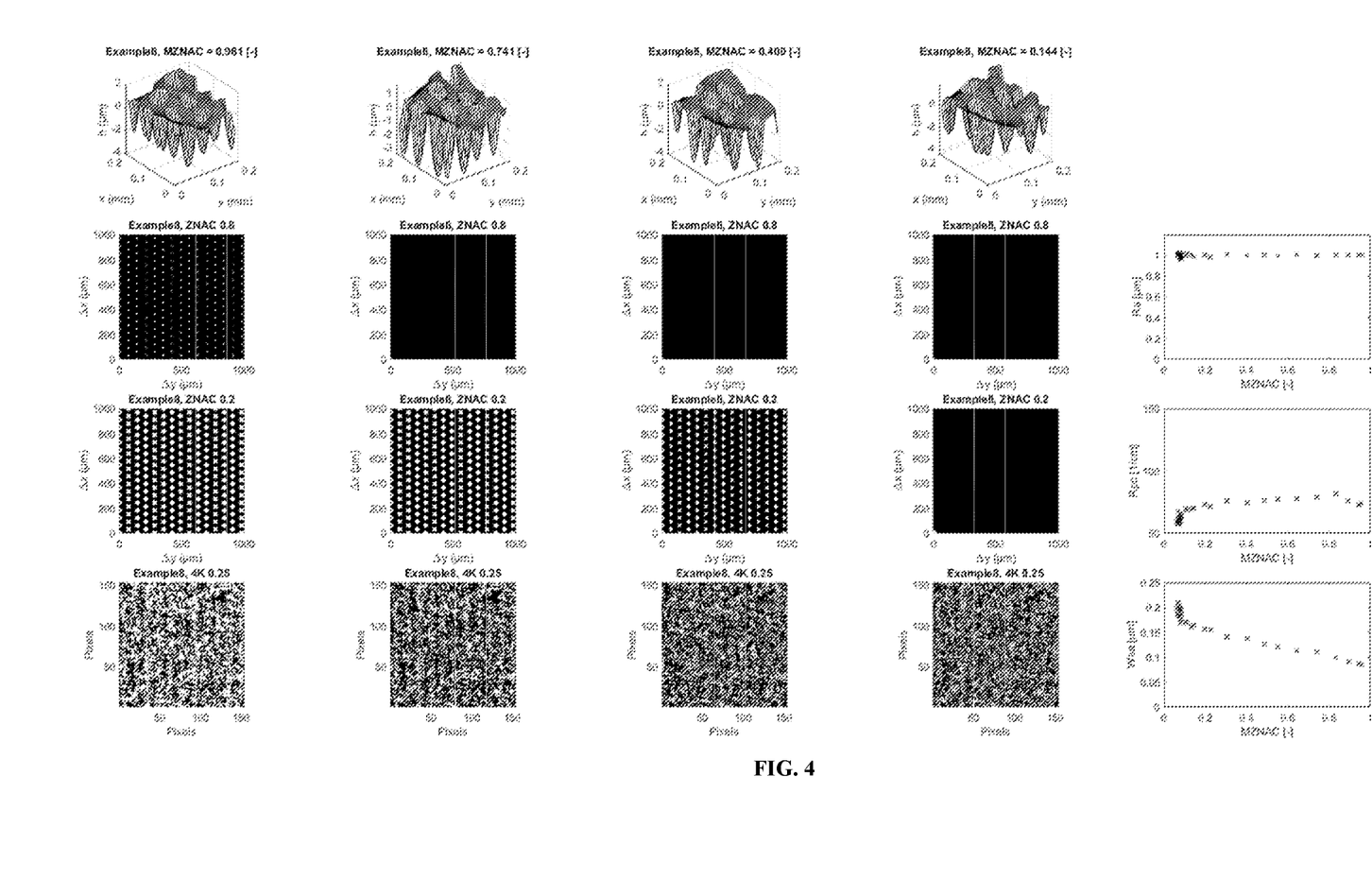
FIG. 4 shows four surface textures of example8, the corresponding ZNAC peaks above 0.8 (second row), the corresponding ZNAC peaks above 0.2 (third row), the corresponding moire patterns (last row), and the correlation of the MZNAC value of example 8 surface textures with parameters Wsa, RPc and Ra.

FIG. 4. Shows four surface textures of example 8 varying from deterministic to pseudo deterministic to stochastic like (left to right), the corresponding ZNAC peaks above 0.8 (second row), the corresponding ZNAC peaks above 0.2 (third row) and the corresponding moiré patterns (last row). FIG. 4 also shows the correlation of the MZNAC value of example 8 surface textures, with parameters Wsa, RPc and Ra.

Figure 5A:
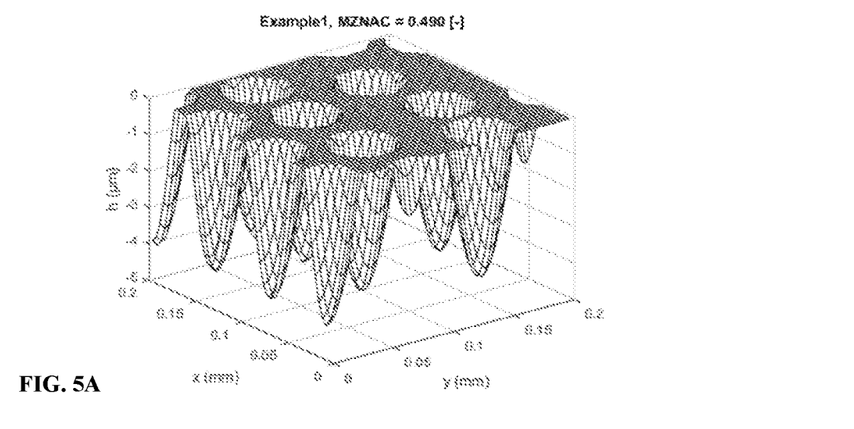
FIG. 5A shows a close up of the surface texture of example 1.
Figure 5B:
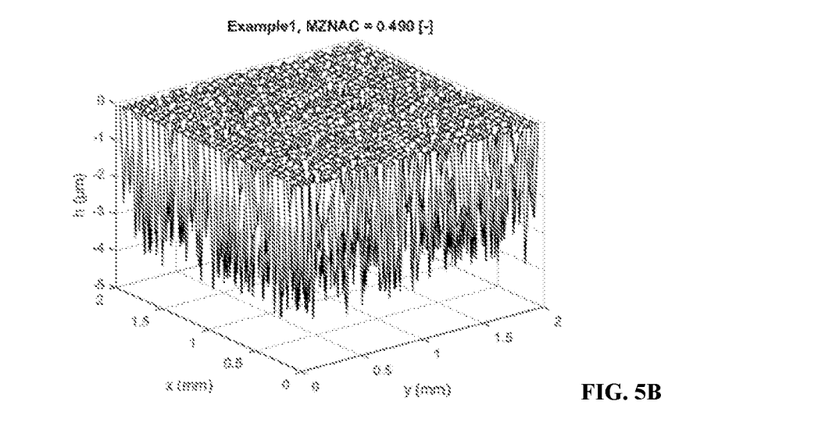
FIG. 5B shows the surface texture of example 1 for a sample of 2 mm x 2 mm.
Figure 5C:
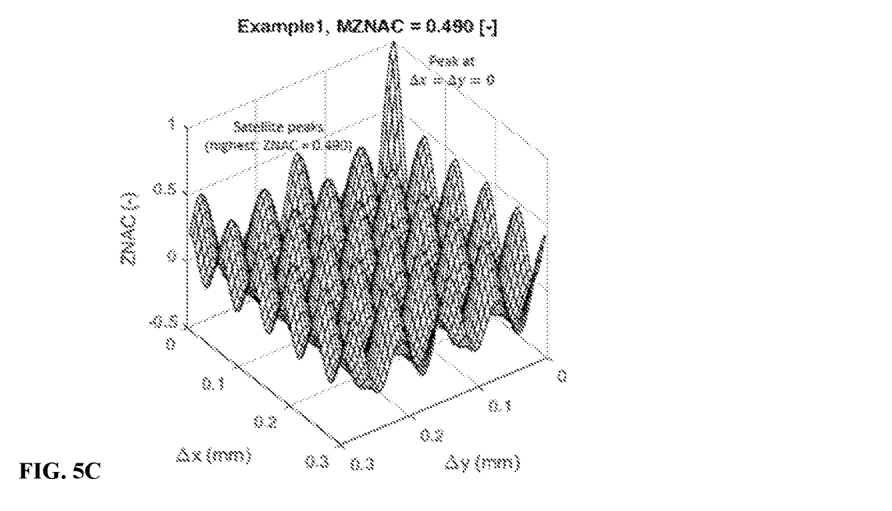
FIG. 5C shows corresponding ZNAC values.

FIG. 5A shows a close up of the surface texture of example 1, FIG. 5B shows the surface texture of example 1 for a sample of 2 mm×2 mm and FIG. 5C shows the corresponding ZNAC values, clearly showing the 0,0 peak ($\Delta x=\Delta y=0$), and the MZNAC of 0.490, corresponding to the highest satellite peak in the ZNAC spectrum.

FIG. 1a, FIG. 1B, FIG. 1C AND FIG. 1D. Show a summary of computational results for surface textures according to the invention and according to the prior art. Several surface textures were modelled and analysed for surface appearance properties such as waviness (Wa), peak count (RPc) and roughness (Ra), moiré effect and related MZNAC. For each example, the spatial distribution of features was either in a hexagonal or square raster with different levels of dislocation based on a superposition of a Gaussian shaped and rectangular shaped distribution. Consequently, the textures varied from deterministic, to pseudo deterministic to stochastic like. The shape of the features as seen on the surface was either circular or square. On average, the features had an amplitude of 7 µm. Example 1 (see also FIG. 2) had depressions with a depth of 7 µm in a hexagonal raster. Example 6 had depressions with rims, which is typically obtained if the surface texture is applied by laser. Example 7-10 show a metal substrate with superposed surface textures. Example 7 (see also FIG. 3) shows a (pseudo)deterministic surface texture on a rough surface, with a depression depth relative to the rough surface, which would be obtained via a method with a laser as texturing means. Example 8 (see also FIG. 4) shows a (pseudo) deterministic surface texture on a rough surface with depressions with a constant minimum, as typically obtained from a process with a work roll as texturing means. For all examples, the ZNAC of the surface of 2 mm×2 mm was obtained from the Zero Normalised Cross Correlation (ZNCC) as described by Pan et.al, Meas. Sci. Technol. 20 (2009) 062001, doi:10.1088/0957-0233/20/6/062001, in table 1, by adjusting the formula for a single surface (f=Z and g=Z). Thus, the ZNAC was obtained from the following equation:

$$ZNAC = \sum_{i=-M}^{M} \sum_{j=-M}^{M} \left\{ \frac{[Z(x_i, y_j) - Z_m] \times [Z(x'_i, y'_j) - Z_m]}{\Delta Z \Delta Z} \right\},$$

with $x'_i = x_i + \Delta x$ and $y'_j = y_j + \Delta y$

The ZNAC was determined for a sample of at least 2 mm×2 mm, with a spacing of at most 2 µm. $\Delta x$ and $\Delta y$ was determined up to at least 0.3 mm. An example of the obtained ZNAC values is given for example 1, with a MZNAC value of 0.49 in FIG. 5. The MZNAC was determined from the ZNAC and relates to the highest peak in the ZNAC, except for the peak at $\Delta x=\Delta y=0$, also referred to as the 0,0 peak. The waviness, roughness and peak count was also analysed.

In addition the moiré effect was visualised by calculating a digital 4K (3840×2160 pixels) photographic image of the examples. A 250 mm×141 mm surface texture was analysed. Each pixel covered a part of the surface of 250/3840 by 141/2160 mm$^2$, roughly corresponding to 65 by 65 µm$^2$. In the calculations, the height of the surface was taken as the original and the intensity of each pixel was calculated as the average height of that piece of the surface that is captured by that pixel. Due to the camera grid, the image is not the same as the original. A 150 by 150 pixels part of the 4K grey scale image was calculated and is shown as a black/white image where the threshold lies halfway the highest and the lowest intensity.

For all examples, a higher waviness was obtained for a lower MZNAC. It was found that a MZNAC below 0.2 resulted in a too large increase in waviness. Therefore the metal substrate provided with a surface texture accorded to the invention should have a MZNAC of at least 0.2 to have good waviness, and hence good paint appearance. At the other hand, a clear moiré pattern was observed for all samples if the MZNAC was above 0.8. The moiré pattern was acceptable for all examples at a MZNAC of at most 0.8. This can be clearly seen in FIG. 2, FIG. 3 and FIG. 4. Furthermore, it was observed from the experiments that a MZNAC between 0.4-0.6 resulted in a significant suppression of the moiré pattern, while maintaining acceptable waviness.

The invention claimed is:

1. A metal substrate provided with a surface texture, wherein Maximum Zero Normalised Auto Correlation (MZNAC) of the surface texture is in a range of 0.2-0.8, wherein the MZNAC corresponds to the highest peak in the Zero Normalised Auto Correlation (ZNAC), except for the peak at $\Delta x=\Delta y=0$, wherein the ZNAC of the surface is obtainable from the following equation:

$$ZNAC = \sum_{i=-M}^{M} \sum_{j=-M}^{M} \left\{ \frac{[Z(x_i, y_j) - Z_m] \times [Z(x'_i, y'_j) - Z_m]}{\Delta Z \Delta Z} \right\},$$

with $x'_i = x_i + \Delta x$ and $y'_j = y_j + \Delta y$.

2. The metal substrate of claim 1, wherein the surface texture has MZNAC in a range of 0.2-0.6.

3. The metal substrate of claim 1, wherein the surface texture has MZNAC in a range of 0.4-0.8.

4. The metal substrate according to claim 1, wherein the surface texture has MZNAC in a range of 0.4-0.6.

5. The metal substrate according to claim 1, wherein the metal substrate comprises a metallic coating.

6. The metal substrate according to claim 1, wherein the surface texture comprises a plurality of features with a pseudo-deterministic spatial distribution.

7. The metal substrate according to claim 1, wherein the features have an average diameter in a range of 25-120 µm.

8. The metal substrate according to claim 1, wherein the features have an amplitude in a range of 0.2-12 µm.

9. The metal substrate according to claim 1, wherein the features have a density in a range between 100 to 10000 per square millimetre.

10. The metal substrate according to claim 1, wherein the waviness (Wsa) is <0.4 µm.

11. The metal substrate according to claim 1, wherein the metal substrate is a blank or a strip.

12. The metal substrate according to claim 1, wherein the features have an amplitude in a range of 2-7 µm.

13. The metal substrate according to claim 1, wherein the features have a density in a range between 180 to 600 per square millimetre.

14. The metal substrate according to claim 1, wherein the metal substrate comprises a zinc based coating.

15. A method to obtain a metal substrate according to claim 1, comprising the steps of
   a. Providing a metal substrate
   b. Optionally temper rolling the metal substrate
   c. Providing a surface texture by texturing means, such as to obtain the metal substrate with MZNAC in the range of 0.2-0.8.

16. A method according to claim 15, wherein the metal substrate comprises a metallic coating.

17. A method according to claim 15, wherein the texturing means is a textured work roll, and wherein the surface texture is provided by imprinting a surface texture on the metal substrate by one or more textured work rolls.

18. A method according to claim 15, wherein the texturing means is a laser and wherein the surface texture is provided by laser ablation or laser assisted melting and redepositing.

* * * * *